Patented Apr. 21, 1942

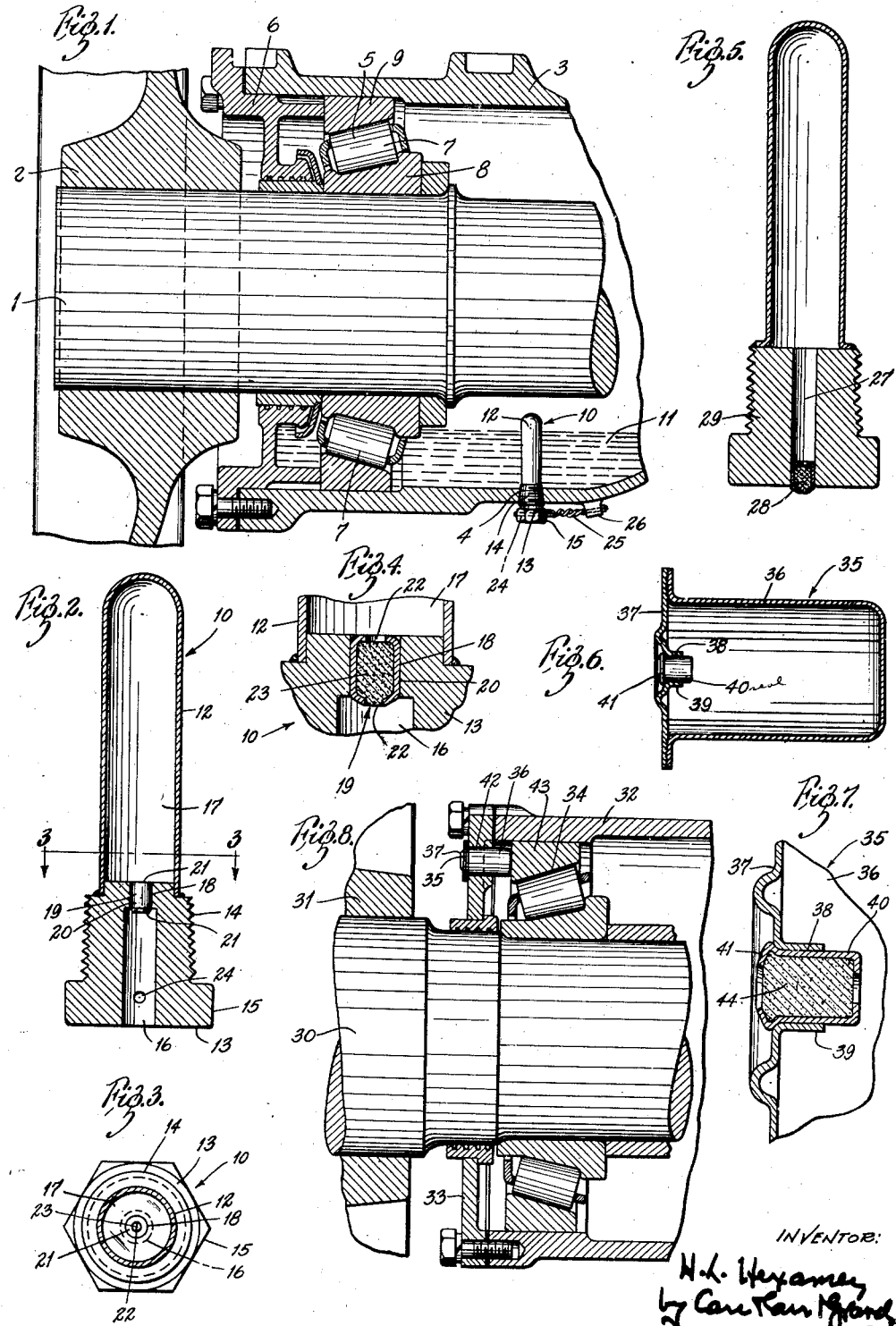

2,280,755

UNITED STATES PATENT OFFICE 2,280,755

THERMIC TELLTALE

Homer L. Hexamer, Canton, Ohio, assignor to The Timken Roller Bearing Company, Canton, Ohio, a corporation of Ohio Application October 28, 1939, Serial No. 301,715

3 Claims. (Cl. 116—106)

This invention relates to thermic telltales for indicating an overheated condition in various constructions. The invention has for its principal object to provide a simple and efficient signaling device of inexpensive and compact construction which can be readily incorporated in various constructions, as for example, a bearing construction, and which is adapted to operate at a predetermined temperature to indicate to the sense of sight, smell, or both, an excessive temperature in the construction in which it is incorporated. The invention consists in the thermic telltale and in the construction, combinations, and arrangements hereinafter described and claimed.

In the accompanying drawing, which forms part of this specification and wherein like symbols refer to like parts wherever they occur, Fig. 1 is a vertical longitudinal section through the end portion of a roller bearing axle construction provided with a thermic telltale embodying my invention, Fig. 2 is an enlarged central longitudinal section through said telltale, Fig. 3 is a transverse section on line 3—3 in Fig. 2, Fig. 4 is a vertical longitudinal section through said telltale in the region of the fusible seal therefor, Fig. 5 is an enlarged central longitudinal section through a modified form of telltale, Fig. 6 is a central longitudinal sectional view of another modified form of telltale, Fig. 7 is an enlarged fragmentary section, similar to Fig. 6, through the end closure member of the telltale; and Fig. 8 is a vertical longitudinal section of another roller bearing construction provided with the telltale device shown in Figs. 6 and 7.

Referring to Fig. 1 of the accompanying drawing, my invention is shown in connection with a roller bearing axle construction; but it is also applicable to other antifriction bearing axle or shaft constructions and to various other constructions where it is desirable to protect the construction against excessive temperatures. The construction shown comprises an axle 1 having a wheel 2 fixed to one end thereof, a lubricant containing housing 3 surrounding the axle inwardly of said wheel and having a threaded drain opening 4 in its bottom, a roller bearing 5 interposed between the axle 1 and housing 3, and an end closure member 6 secured to the end of the housing for closing the annular space between the axle and housing. The roller bearing 5 comprises a series of conical rollers 7 interposed between a cone or inner raceway member 8 mounted on the axle 1 and a cup or outer raceway member 9 mounted in the bearing housing 3.

The above construction is provided with a thermic telltale 10 for indicating to the sense of smell, sight, or both, an overheated condition in the roller bearing. The telltale is preferably embodied in said construction by being threaded into the drain opening 4 of the housing 3 to thereby constitute a plug for said opening. As mounted, the telltale extends upwardly into the lubricant 11 in the bearing housing.

As illustrated in Figs. 2 and 3, the telltale 10 comprises a hollow tubular portion or cartridge 12 having a plug member 13 secured to its lower end in any suitable manner or if desirable integral therewith. On the upper portion of said plug member is an external thread 14 adapted to engage the threaded drain opening 4 in the bottom of the axle housing. The lower outer portion 15 of said plug member is flat-sided and adapted to receive a wrench.

A central passageway or bore 16 leads through said plug member into a chamber 17 in the hollow tubular portion 12 of the telltale device. The upper portion 18 of this narrow passageway or bore 16 adjacent to the chamber is of smaller diameter than the lower portion and forms a seat adapted to seat a seal 19. The chamber in the hollow tubular portion 12 of the telltale is adapted to contain an odoriferous or smoke producing liquid or both. The seal 19 is in position to close the narrow upper end portion 18 of passageway or bore 16 of the plug and thus cut off communication between the chamber 17 and the portion of said passageway located outwardly of said seal.

The seal comprises a cylindrical steel shell 20 with inturned end flanges 21 forming openings 22 at the ends of said shell. The steel shell contains a core 23 of fusible metal which closes the openings in the shell. This seal is pressfitted into the narrow upper portion 18 of the passageway 16 in the plug 13.

The plug member of the telltale is provided near its outer end with radial bores or passageways 24 adapted to receive a wire 25 which has one end anchored in a lug 26 provided therefor on the axle housing and has its other end twisted around the wire extending between said telltale device and said lug. This wire prevents the telltale device from working loose in the opening.

The operation of my device is as follows, the chamber 17 in the hollow tubular portion of the telltale device is filled with signaling material and the passageway or bore 16 through the plug member 13 is closed by the seal 19 with the fusible core 23. The device is positioned in the axle housing 3 and has its upper portion surrounded by the lubricant 11 in said housing. Heat is transmitted from the bearing 5 to the telltale device 10 through the lubricant and when the bearing temperature reaches a critical point due to defects or unusual conditions in the bearing assembly, the fusible core 23 of the seal melts and thus opens the passageway through the plug member, thereby establishing communication between the chamber containing the signaling fluid and the atmosphere. The escape of the signal fluid will constitute a warning which communicates to the sense of sight, smell, or both, thereby indicating that the bearing requires attention.

The modification shown in Fig. 5 is similar to the preferred embodiment of my invention described above, the main difference being in the passageway or bore through the plug member and in the position of the seal. The passageway or bore 27 has the same diameter throughout in the modification and the seal 28 is pressfitted into the lower end thereof. The modification shown in this figure does not have a radial bore 24 through the plug member 29. Such a bore through the passageway 27 would permit the escape of the signaling material. This telltale is positioned in the axle housing the same as the telltale described above and it is similar in operation.

In Fig. 8, a modified telltale device is shown with a roller bearing journal box construction. The construction shown comprises an axle 30 having a wheel 31 fixed at one end thereof, a housing 32 surrounding the axle, and an end closure plate 33. A roller bearing 34 is interposed between said housing and said axle. As shown in Figs. 6 and 7, the telltale device 35 comprises a cylindrical container 36 having an end member 37 with a circular opening 38 in its central portion. The end member 37 is flanged inwardly around the opening, the flanges 39 providing a support for a seal 40 which is pressfitted in said opening and has an enlarged head portion 41 at its outer end that seats against said end member. The telltale device 35 is mounted in a longitudinal bore 42 in the end closure plate 33 and abuts against the cup or outer raceway member 43 of the bearing 34. When the bearing becomes excessively hot, the heat is transmitted to the other end of the telltale device to the seal 40 and the fusible core 44 in said seal melts permitting the signaling material to escape.

The hereinbefore described telltale device has numerous advantages. It may be easily incorporated into many existing constructions without material alterations, it is practical and efficient and may be removed and refilled easily.

Reference is hereby made to my copending application Serial No. 411,795, filed September 22, 1941, for subject matter shown but not claimed herein.

What I claim is:

1. A thermic telltale comprising a sheet metal cup adapted to contain a signaling material, a sheet metal cover for said cup permanently united to the open end thereof to provide a leakproof closure therefor, said cover having a flanged opening extending therethrough in communication with the interior of said cup, and a fusible seal fitting within and closing said flanged opening in said cover.

2. A thermic telltale comprising a sheet metal cup adapted to contain a signaling material, a sheet metal cover for said cup permanently united to the open end thereof to provide a leakproof closure therefor, said cover having an inwardly flanged opening extending therethrough in communication with the interior of said cup, and a fusible seal fitting within and closing said flanged opening in said cover, said seal comprising a tube pressfitted in said flanged opening in said cover and a fusible core in said tube.

3. A thermic telltale comprising a sheet metal cup adapted to contain a signaling material, a sheet metal cover for said cup permanently united to the open end thereof to provide a leakproof closure therefor, said cover having an inwardly flanged opening extending therethrough in communication with the interior of said cup, and a fusible seal fitting with and closing said flanged opening in said cover, said seal comprising a tube pressfitted in said flanged opening in said cover and a fusible core in said tube, said tube terminating at its outer end in an enlarged head portion adapted to seat against said cover around the outer end of the flanged opening therein and said cover having a hollow outstanding rib in the outer face thereof surrounding said enlarged head portion of said tube.

HOMER L. HEXAMER.